United States Patent
Frederiksen et al.

(10) Patent No.: US 11,623,684 B2
(45) Date of Patent: Apr. 11, 2023

(54) HYDRAULIC STEERING UNIT

(71) Applicant: Danfoss Power Solutions ApS, Nordborg (DK)

(72) Inventors: Mogens Frederiksen, Sydals (DK); Niels Arbjerg, Sydals (DK); Poul Ennemark, Sønderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 0 days.

(21) Appl. No.: 17/191,226

(22) Filed: Mar. 3, 2021

(65) Prior Publication Data
US 2021/0284229 A1    Sep. 16, 2021

(30) Foreign Application Priority Data
Mar. 10, 2020   (DE) .................. 102020106440.3

(51) Int. Cl.
*B62D 5/087* (2006.01)
*B62D 5/09* (2006.01)

(52) U.S. Cl.
CPC ............... *B62D 5/087* (2013.01); *B62D 5/09* (2013.01)

(58) Field of Classification Search
CPC .......... B62D 5/087; B62D 5/09; B62D 5/083; B62D 5/097
USPC ....................................... 180/411
See application file for complete search history.

(56) References Cited

U.S. PATENT DOCUMENTS

| | | | | |
|---|---|---|---|---|
| 2,798,461 A | * | 7/1957 | Gold | F15B 13/04 137/625.69 |
| 2,827,976 A | * | 3/1958 | Brand | B62D 5/087 91/382 |
| 2,984,215 A | * | 5/1961 | Charlson | B62D 5/097 418/61.3 |
| 3,528,521 A | | 9/1970 | Ellis | |

(Continued)

FOREIGN PATENT DOCUMENTS

| | | |
|---|---|---|
| CN | 1189134 A | 7/1998 |
| CN | 101970277 A | 2/2011 |

(Continued)

OTHER PUBLICATIONS

First Examination Report for Indian Serial No. 202114001805 dated Feb. 10, 2022.

(Continued)

*Primary Examiner* — Jacob B Meyer
*Assistant Examiner* — Myles A Harris
(74) *Attorney, Agent, or Firm* — McCormick, Paulding & Huber PLLC (57) ABSTRACT

The invention relates to a hydraulic steering unit (1) including a housing (3), a spool, a sleeve (12) arranged between spool and housing (3), and a measuring motor (14) having a number of working chambers (15), wherein a first commutation geometry (18) and a second commutation geometry (19) are arranged between the sleeve (12) and the housing (3), wherein the commutation geometries (18, 19) are connected to the working chambers (15) of the measuring motor (14) and the housing includes a first direction port (4), a second direction port (5), a pressure port (6), and a return port (7). The object is to have a good steering behavior. To this end one of the commutation geometries (18) is directly connected to the first direction port (4).

12 Claims, 6 Drawing Sheets

(56) References Cited

U.S. PATENT DOCUMENTS

| | | | | |
|---|---|---|---|---|
| 3,658,449 | A * | 4/1972 | Woodling | F04C 2/104 418/61.3 |
| 3,739,577 | A * | 6/1973 | Nagase | B62D 5/083 91/375 R |
| 3,801,239 | A * | 4/1974 | Larson | B62D 5/097 418/61.3 |
| 3,805,838 | A * | 4/1974 | Christensen | F16K 11/0708 251/209 |
| 3,819,307 | A * | 6/1974 | Uppal | B62D 5/097 418/61.3 |
| 3,937,601 | A * | 2/1976 | Miller | B62D 5/097 418/61.3 |
| 3,964,371 | A * | 6/1976 | Wagner | B62D 5/087 91/434 |
| 4,174,612 | A * | 11/1979 | Liebert | B62D 5/097 137/596.13 |
| 4,270,349 | A * | 6/1981 | Ljubimov | B62D 5/087 60/386 |
| 4,311,171 | A * | 1/1982 | Roberts | B62D 5/083 418/61.3 |
| 4,409,789 | A * | 10/1983 | Hansen | B62D 5/06 60/473 |
| 4,452,274 | A * | 6/1984 | Haga | B62D 5/083 91/375 A |
| 4,671,747 | A * | 6/1987 | Arbjerg | B62D 5/097 91/375 R |
| 4,711,315 | A * | 12/1987 | Kitamura | B62D 5/083 91/375 R |
| 4,923,170 | A * | 5/1990 | Takaoka | B62D 5/087 251/324 |
| 4,934,911 | A * | 6/1990 | Schulz | F04C 2/104 418/61.3 |
| 5,101,860 | A | 4/1992 | Stephenson | |
| 5,273,072 | A * | 12/1993 | Phillips | B62D 5/083 91/375 R |
| 5,435,698 | A * | 7/1995 | Phillips | F04C 15/06 417/220 |
| 5,505,119 | A * | 4/1996 | Phillips | B62D 5/083 91/375 R |
| 5,701,970 | A * | 12/1997 | Arbjerg | B62D 5/093 180/417 |
| 5,725,023 | A * | 3/1998 | Padula | B62D 5/06 137/596.17 |
| 5,730,040 | A * | 3/1998 | Strong | B62D 5/083 91/375 A |
| 5,845,736 | A * | 12/1998 | Bohner | B62D 6/00 91/363 R |
| 6,182,786 | B1 * | 2/2001 | Rom | B62D 1/28 180/441 |
| 6,237,331 | B1 * | 5/2001 | Sørensen | B62D 5/06 60/387 |
| 6,318,078 | B1 * | 11/2001 | Novacek | B62D 5/09 60/494 |
| 6,769,451 | B2 * | 8/2004 | Hjelsand | B62D 5/07 91/375 A |
| 6,863,147 | B2 * | 3/2005 | Catellani | B62D 5/093 180/417 |
| 7,364,006 | B2 * | 4/2008 | Birsching | B62D 5/083 91/375 A |
| 7,610,935 | B2 * | 11/2009 | Arbjerg | B62D 5/097 251/283 |
| 9,211,907 | B2 * | 12/2015 | Kubo | B62D 5/065 |
| 2003/0006087 | A1 * | 1/2003 | Sahr | B62D 5/22 180/441 |
| 2006/0075747 | A1 * | 4/2006 | Shiina | B62D 6/02 60/384 |
| 2011/0283694 | A1 * | 11/2011 | Smith | B62D 5/097 60/494 |
| 2012/0097471 | A1 * | 4/2012 | Sakamaki | B62D 15/027 180/421 |
| 2018/0009471 | A1 * | 1/2018 | Novacek | F15B 13/0401 |
| 2018/0105203 | A1 * | 4/2018 | Takenaka | B62D 5/09 |
| 2019/0031233 | A1 * | 1/2019 | Bergmann | B62D 5/093 |
| 2020/0108862 | A1 * | 4/2020 | Pippes | B62D 5/32 |

FOREIGN PATENT DOCUMENTS

| | | | | |
|---|---|---|---|---|
| DE | 2015897 | A1 * | 10/1971 | |
| DE | 4204336 | A1 | 8/1993 | |
| DE | 4241036 | C1 * | 4/1994 | B62D 5/06 |
| DE | 102006026394 | A1 | 2/2007 | |
| EP | 2610139 | A1 | 3/2013 | |
| FR | 1495400 | A | 9/1967 | |
| GB | 1342503 | A * | 1/1973 | |
| JP | S50-4731 | U | 1/1975 | |
| JP | 59230864 | A * | 12/1984 | |
| KR | 970041001 | A * | 7/1997 | |
| KR | 2006-0061663 | A | 6/2006 | |
| KR | 20080010529 | A * | 1/2008 | |
| WO | WO-03093089 | A1 * | 11/2003 | B62D 5/0837 |
| WO | WO-2008069552 | A1 * | 6/2008 | B62D 5/093 |

OTHER PUBLICATIONS

First Examination Report for Indian Serial No. 202114002243 dated Feb. 11, 2022.
First Examination Report for Indian Serial No. 202114002244 dated Jan. 18, 2022.

* cited by examiner

PRIOR ART

Fig.6a Fig.6b Fig.6c Fig.6d

HYDRAULIC STEERING UNIT

CROSS-REFERENCE TO RELATED APPLICATION

This application claims foreign priority benefits under 35 U.S.C. § 119 to German Patent Application No. 102020106440.3 filed on Mar. 10, 2020, the content of which is hereby incorporated by reference in its entirety.

TECHNICAL FIELD

The present invention relates to a hydraulic steering unit comprising a housing, a spool, a sleeve arranged between spool and housing, and a measuring motor having a number of working chambers, wherein a first commutation geometry and a second commutation geometry are arranged between the sleeve and the housing, wherein the commutation geometries are connected to the working chambers of the measuring motor and the housing comprises a first direction port, a second direction port, a pressure port, and a return port.

BACKGROUND

Such a steering unit is known, for example, from U.S. Pat. No. 4,671,747 A. When the driver of the vehicle equipped with such a steering unit rotates a steering wheel, the spool is rotated relatively to the sleeve. This operation opens some orifices and closes other orifices. Hydraulic fluid from the pressure port is guided to the measuring motor which is connected to the sleeve. When the measuring motor is driven by the flow of hydraulic fluid, it restores the original angular relation between spool and sleeve once the necessary amount of hydraulic fluid has been supplied to one of the direction ports.

SUMMARY

The object underlying the present invention is to have a good steering behaviour.

This object is solved with a hydraulic steering unit as described at the outset in that one of the commutation geometries is directly connected to the first direction port.

The direction ports of the housing are connected to or form the working ports of the steering unit. The working ports can be connected to a steering motor. When the one of the commutation geometries, for example the first commutation geometry, is directly connected to the first direction port, the measuring motor is likewise directly connected to the first direction port, i. e. it is arranged in a working flow path through which hydraulic fluid is supplied to or returned from one of these working ports, depending on the steering direction of the steering motor. When the measuring motor is arranged in a working flow path, it is directly driven by the hydraulic fluid supplied to or returned from the steering motor which improves the steering behaviour. This can be realized simply by redesigning the first commutation geometry. When the commutation geometry is directly connected to the first direction port, this means that there are no orifices involved in the steering process between the direction port and the first commutation geometry.

In an embodiment of the invention the first commutation geometry is formed exclusively between the sleeve and the housing. No further elements are necessary.

In an embodiment of the invention the first commutation geometry comprises a first circumferential groove having a closed bottom, said first circumferential groove being connected to first axial grooves extending in a region of the housing in which channels open which are connected to the working chambers. The measuring motor comprises a number of working chambers, for example seven working chambers. The seven working chambers are connected by means of seven channels to a circumferential wall of a bore in the housing in which the sleeve is arranged. The sleeve comprises a number of axial grooves, wherein the number of axial grooves is one less than the number of working chambers. Since the axial grooves extend in a region of the housing in which the channels open, it is possible to connect the first circumferential groove to some of the working chambers. Depending on the direction of rotation of the sleeve, the first direction port is connected to working chambers supplying hydraulic fluid to the first direction port or, when rotated in the opposite direction, to working chambers receiving hydraulic fluid from the first direction port. Basically, the first commutation geometry corresponds to previously known commutation geometries. However, in contrast to the previously known commutation geometries, there are no connections between the first commutation geometry and the spool.

In an embodiment of the invention the second commutation geometry comprises a second circumferential groove being connected to second axial grooves extending in the region of the housing, wherein the second commutation geometry comprises openings to the spool. The second commutation geometry is able to supply or to return hydraulic fluid to the spool, so that the spool and the sleeve together can fulfil valve functions.

In an embodiment of the invention the second commutation geometry connects the pressure port to the measuring motor when spool and sleeve are rotated relatively to each other in one direction and connects the tank port to the measuring motor when spool and sleeve are rotated relatively to each other in the opposite direction. Thus, the flow of hydraulic fluid through the measuring motor is controlled by the cooperation of first commutation geometry and second commutation geometry.

BRIEF DESCRIPTION OF THE DRAWINGS

The invention will now be described in more detail with reference to the drawing, wherein.

DETAILED DESCRIPTION

Figure 5:
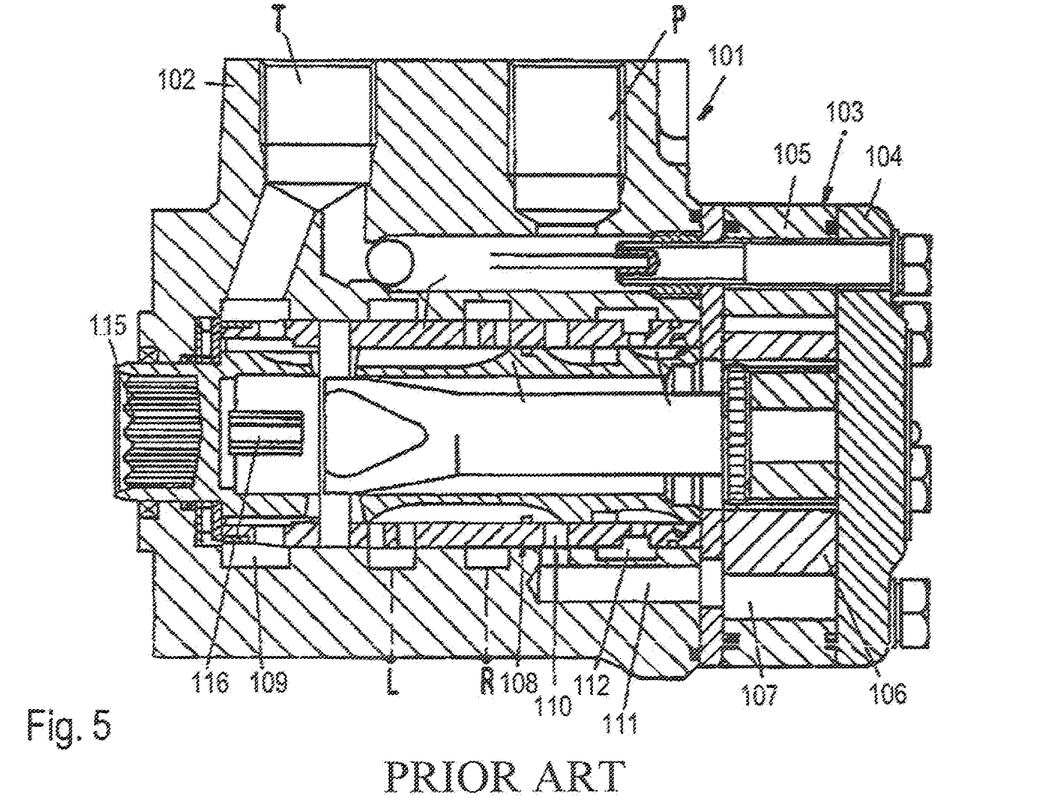
FIG. 5 shows a schematically a fluid controller in a sectional view.
Figure 6A:
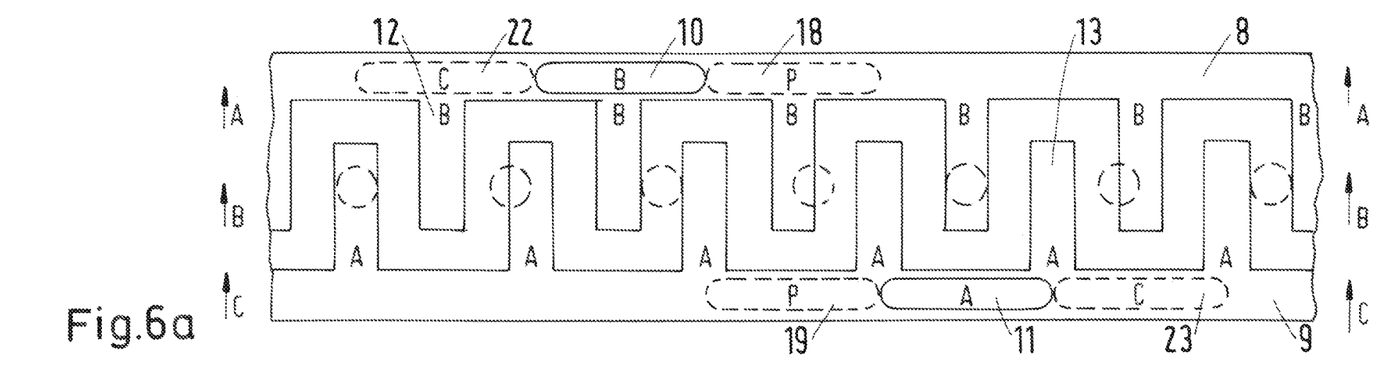
Figure 6B:
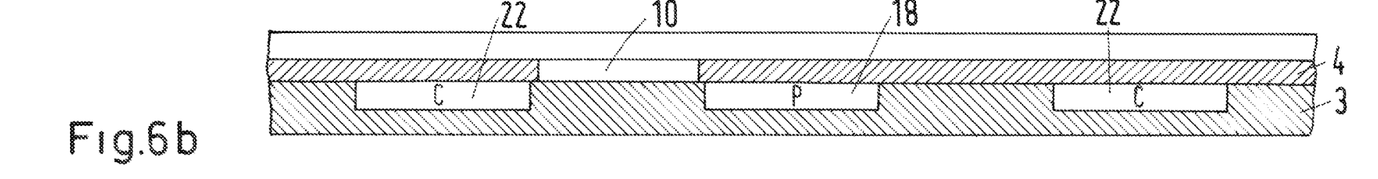
Figure 6C:
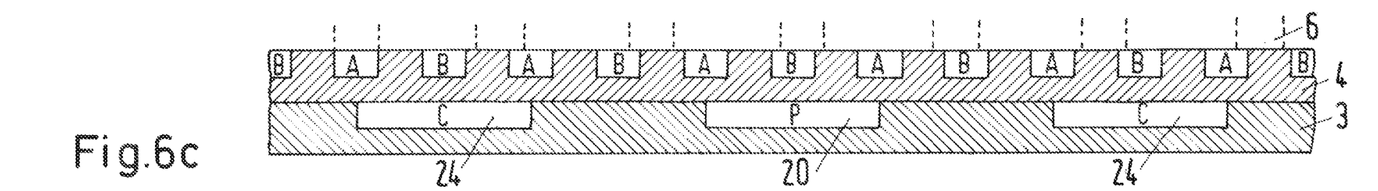
Figure 6D:
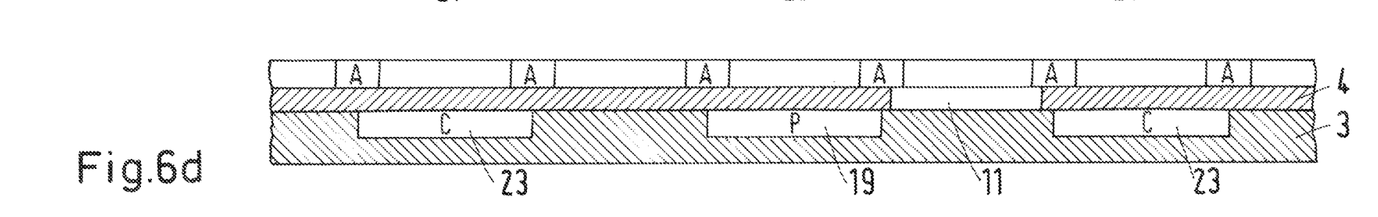

FIG. 5 illustrates a control device 101 comprising a housing 102, a fluid meter 103, and an end plate 104. The inlet P is connected to a pump and the outlet T is connected to a system reservoir from which the pump receives the fluid. The control ports are not visible in the shown cross section but the letters L and R point at annular chambers to which the control ports are in communication. The fluid meter 103 comprises a stationary gear ring 105 (or star ring) having internal teeth, and a rotating and planetary gear 106 (or star wheel) having external teeth. The gears form volume chambers 107 which expand and contract during the movement of the external teeth between the internal teeth.

A valve member 108 is rotatably disposed in the housing in which an annular chamber 109 is in communication with the outlet T. L is connected to one end of a steering cylinder and R is connected to the other end of the steering cylinder via control ports which as aforementioned are not shown in the FIG. L and R form working ports or direction ports. A plurality of meter ports 110 provided in the valve member 108 communicate between the volume chambers 107 via the axial passages 111 which are provided in the housing. The annular chamber 112 is in communication with the inlet P and thereby with the fluid under pressure delivered by the pump.

The valve member 108 comprises a sleeve 113 and a spool 114. The spool comprises a coupling end 115 which is driven by the operator of a vehicle via a drive wheel. The spool and the sleeve can be turned relatively to each other through a predetermined angle in both directions out of a neutral position against the force of radial leaf springs 116. The planetary gear 106 and thereby the displacement of the fluid out of the chambers of the fluid meter is driven by the sleeve via a pin and a cardan shaft 117 connected between the sleeve and the planetary gear. When the resistance against the displacement of the fluid exceeds the rigidity of the spring 116, the sleeve starts to slip and rotates relative to the spool whereby the spool moves from the neutral configuration to an operating configuration whereby the valve member establishes a passage between the inlet P and one of the control ports (L, R) and between the other control port and the outlet T, respectively.

Figure 1A:
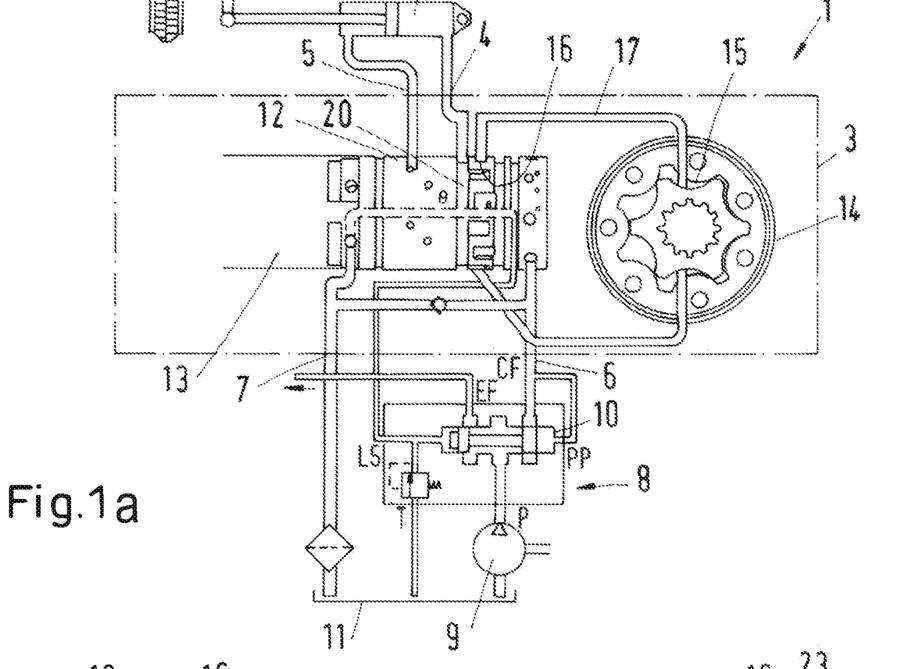
FIG. 1 is a schematic illustration of a hydraulic steering unit in neutral position.

FIG. 1a schematically shows a hydraulic steering unit 1 which is connected to a steering motor 2. The steering unit comprises a housing 3 having a first direction port 4, a second direction port 5, a pressure port 6 and a return port 7. The direction ports 4, 5 can also be named "working ports".

The pressure port 6 is connected to a pressure source 8. In the present case the pressure source 8 comprises a pump 9 and a priority valve 10. However, other pressure sources can be used, for example a pump with variable displacement.

The return port 7 is connected to a tank 11.

The hydraulic steering unit 1 comprises a sleeve 12 which is rotatably arranged in a bore 13 of the housing 3. A spool 26 (FIGS. 1b and 1c) is rotatably arranged within sleeve 12. Furthermore, the hydraulic steering unit 1 comprises a measuring motor 14. The measuring motor 14 comprises a number of working chambers 15 formed by a rotor 24. In the present case, the measuring motor 14 comprises seven working chambers 15.

The working chambers 15 are connected to openings 16 in the wall of bore 13 by means of channels 17. Thus, the wall of the bore 13 comprises seven openings 16. The openings 16 are distributed evenly in circumferential direction.

Figure 4:
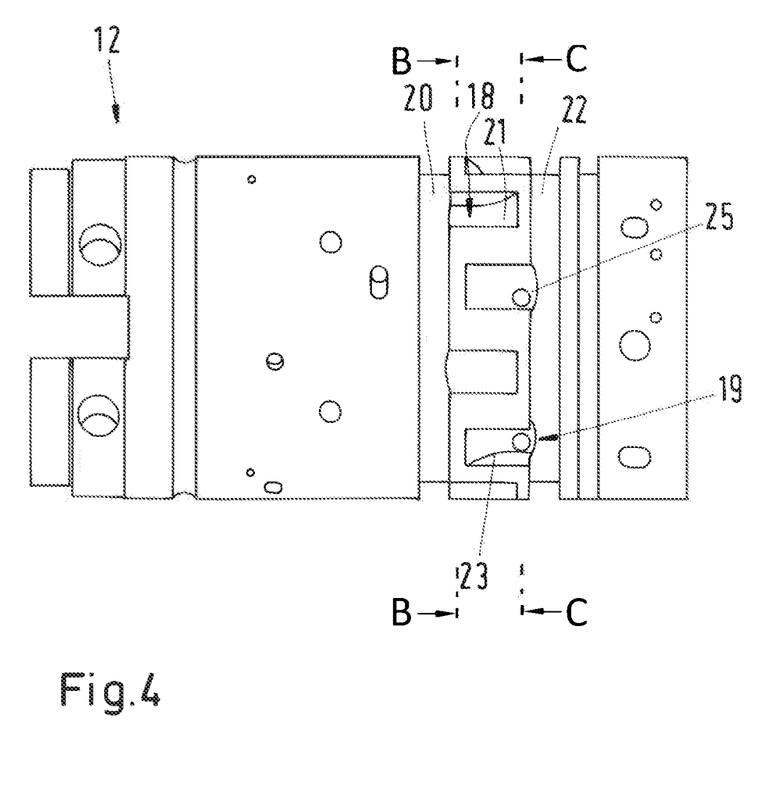

The sleeve 12 which is shown in an enlarged view in FIG. 4 comprises a first commutation geometry 18 and a second commutation geometry 19. The two commutation geometries 18, 19 are intended to come in overlapping relation with the openings 16 in the wall of the bore 13.

The first commutation geometry 18 comprises a circumferential groove 20. The circumferential groove 20 is connected to a number of first axial grooves 21. The number of first axial grooves 21 is one less than the number of openings 16 in the wall of the bore 13. In other words, there are six first axial grooves 21 in the first commutation geometry 18.

The second commutation geometry 19 comprises a second circumferential groove 22 and a number of second axial grooves 23. The number of second axial grooves 23 is one less than the number of openings 16 in the wall of the bore 3. In other words, in the present case there are six second axial grooves.

The first axial grooves 21 extend in axial direction to a region of the housing where the openings 16 are arranged. The second axial grooves 23 extend (to the other axial direction) to the same region, so that the first axial grooves 21 and the second axial grooves 23 overlap each other in axial direction.

The second commutation geometry 19 comprises some bores 25 through which hydraulic fluid can flow into the interior of the sleeve 12 to the spool 26. However, the first commutation geometry 18 does not have such bores. The first circumferential groove 20 has a closed bottom and the first axial grooves 21 are closed on the radial inner side as well. Thus, in the first commutation geometry 18 there is no connection between the first commutation geometry 18 and the spool 26 within the sleeve 12.

Figure 1B:
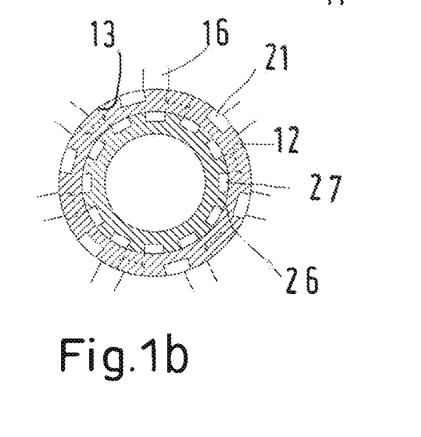
Figure 1C:
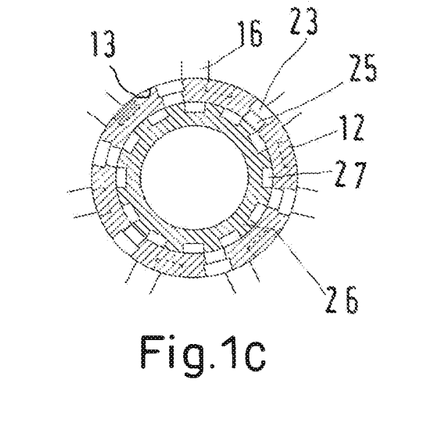

FIG. 1b shows a sectional view B-B according to FIG. 4 through the first commutation geometry 18, more precisely along a line between the first circumferential groove 20 and the second axial grooves 23. FIG. 1c shows a sectional view C-C according to FIG. 4 through the second commutation geometry 19, more precisely along a line between the second circumferential groove 21 and the first axial grooves 22, the line cutting the bores 25.

The spool 26 comprises a number of axial spool grooves 27, wherein the number, for each direction of rotation, is one less than the number of working chambers 15 of the measuring motor 14. In the present case there are twelve axial spool grooves 27. The axial spool grooves 27 of the spool 26 extend in axial direction at least to the openings 25 in the sleeve. The axial spool grooves 27 together with the openings 25 form orifices, which are part of a valve arrangement. The valve arrangement may have further orifices which are formed between spool 12 and sleeve 26 (not shown).

In a neutral position of the sleeve 12 (FIG. 1) some first axial grooves 21 and some second axial grooves 23 overlap the openings 16 in the bore 13 of the housing 3. However, the openings 25 are closed by the spool 26. Thus, there is no connection between the second circumferential groove 21 and the axial spool grooves 27 of the sleeve. Thus, there is no fluid connection between the pressure port 6 and one of the direction ports 4, 5.

As can be seen in FIG. 1, the first circumferential groove 20 is connected to the first direction port 4. The second direction port 5 is connected to another part of the sleeve 12.

Figure 2A:
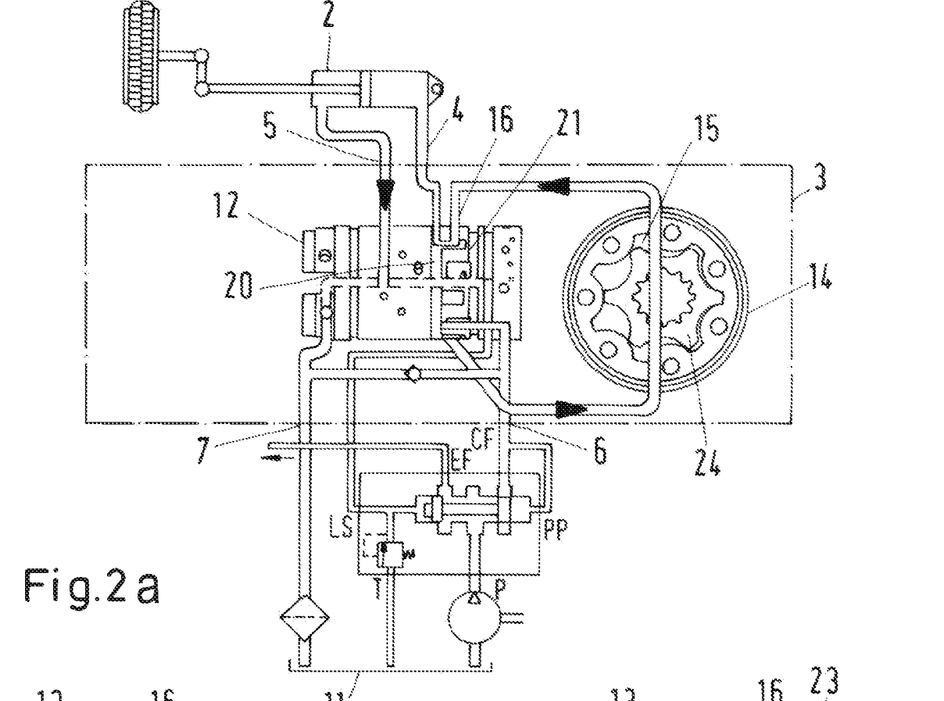
FIG. 2 is a schematic illustration of the steering unit in steering right position.
Figure 2B:
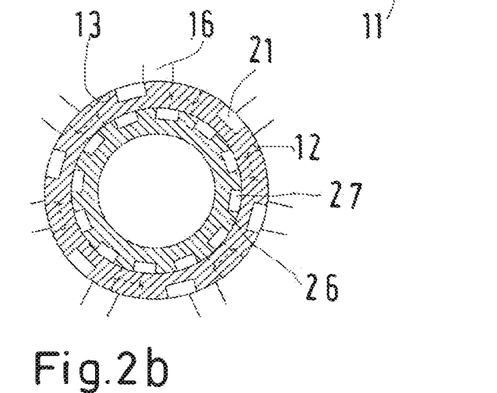
Figure 2C:
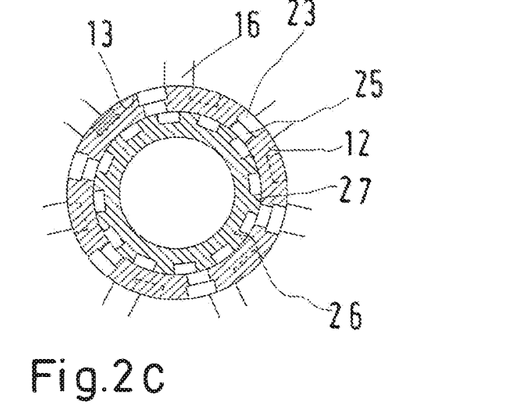

In a "steering right" position (FIG. 2) the spool 26 has been rotated in relation to the sleeve 12 so that the first axial spool grooves 27 come in overlapping relation to the openings 25. FIG. 2b shows a sectional view B-B and FIG. 2c shows a sectional view C-C according to FIG. 4 Some of the first axial grooves 21 are in overlap with openings 16 in the bore of the housing 3 which are connected to working chambers 15 having a decreasing volume. Some of the second axial grooves 23 are in overlap with other openings 16 which are connected to working chambers 15 having an increasing volume. In this case, the rotor 24 of the measuring motor 14 rotates clockwise. A flow path for the hydraulic fluid from the pressure port 6 to the direction port 4 is established, wherein the measuring motor 14 is arranged in the working flow path to the direction port 4.

Hydraulic fluid returned from the steering motor 2 via the second direction port 5 is returned via other orifices between the sleeve 12 and the spool 26 to the tank 11.

Figure 3:
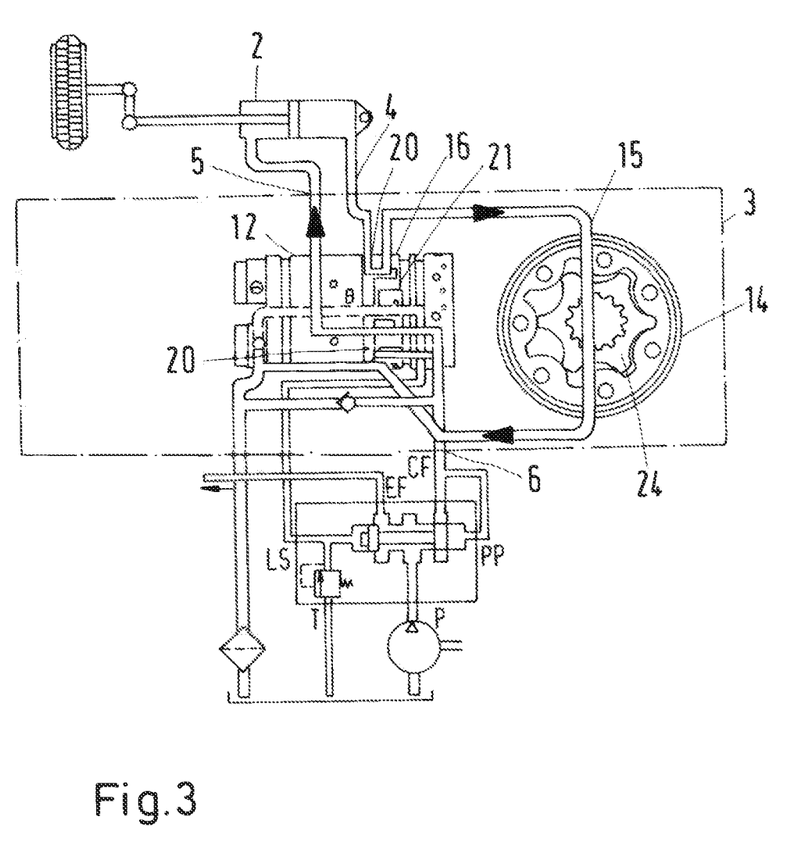
FIG. 3 is a schematic illustration of the steering unit in steering left position, FIG. 4 an enlarged view of the sleeve.

In the "steering left" position the flow direction has been reversed. Hydraulic fluid from the pressure port 6 is supplied via some orifices (not shown in detail) which are formed between the sleeve 12 and the spool 26 to the second direction port 5. Hydraulic fluid returning from the steering motor 2 via first direction port 4 is supplied to the first circumferential groove 20 and via the first axial grooves 21 to the working chambers 15 of the measuring motors 14, wherein these working chambers 15 have increasing volume. To this end the rotor 24 of the measuring motor 14 is rotated in counter clockwise direction.

In this way it is possible to arrange the measuring motor 14 directly in a working flow path, i.e. a path between the orifices of the steering unit and the direction port 4. In other words, the first direction port 4 is directly connected to the first first commutation geometry 18 without any orifices involved in the steering process.

In the present case the first direction port 4 is used to steer to the right and the second direction port 5 is used to steer to the left. However, it is possible to use the two direction ports 4, 5 the other way round.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering unit comprising:
a housing,
a spool,
a sleeve arranged between spool and housing,
and a measuring motor having a number of working chambers,
wherein a first commutation geometry and a second commutation geometry are arranged between the sleeve and the housing,
wherein the commutation geometries are connected to the working chambers of the measuring motor
and the housing comprises a first direction port, a second direction port, a pressure port, and a return port,
wherein a first commutation geometry is directly connected to the first direction port,
and wherein the first commutation geometry extends between the first direction port and working chamber openings formed in the housing without any orifices located therebetween.

2. The hydraulic steering unit according to claim 1, wherein the first commutation geometry is formed exclusively between the sleeve and the housing.

3. The hydraulic steering unit according to claim 1, wherein the second commutation geometry connects the pressure port to the measuring motor when spool and sleeve are rotated relatively to each other in one direction and connects the tank port to the measuring motor when spool and sleeve are rotated relatively to each other in the opposite direction.

4. The hydraulic steering unit according to claim 2, wherein the second commutation geometry connects the pressure port to the measuring motor when spool and sleeve are rotated relatively to each other in one direction and connects the tank port to the measuring motor when spool and sleeve are rotated relatively to each other in the opposite direction.

5. The hydraulic steering unit according to claim 2, wherein the first commutation geometry comprises a first circumferential groove having a closed bottom, said first circumferential groove being connected to first axial grooves extending in a region of the housing in which channels open which are connected to the working chambers.

6. The hydraulic steering unit according to claim 5, wherein the second commutation geometry connects the pressure port to the measuring motor when spool and sleeve are rotated relatively to each other in one direction and connects the tank port to the measuring motor when spool and sleeve are rotated relatively to each other in the opposite direction.

7. The hydraulic steering unit according to claim 5, wherein the second commutation geometry comprises a second circumferential groove being connected to second axial grooves extending in the region of the housing, wherein the second commutation geometry comprises openings to the spool.

8. The hydraulic steering unit according to claim 7, wherein the second commutation geometry connects the pressure port to the measuring motor when spool and sleeve are rotated relatively to each other in one direction and connects the tank port to the measuring motor when spool and sleeve are rotated relatively to each other in the opposite direction.

9. A hydraulic steering unit comprising:
a housing,
a spool,
a sleeve arranged between spool and housing,
and a measuring motor having a number of working chambers,
wherein a first commutation geometry and a second commutation geometry are arranged between the sleeve and the housing,
wherein the commutation geometries are connected to the working chambers of the measuring motor and the housing comprises a first direction port, a second direction port, a pressure port, and a return port,
wherein a first commutation geometry is directly connected to the first direction port, and
wherein the second commutation geometry connects the pressure port to the measuring motor when spool and sleeve are rotated relatively to each other in one direction and connects the tank port to the measuring motor when spool and sleeve are rotated relatively to each other in the opposite direction.

10. The hydraulic steering unit according to claim 9, wherein the first commutation geometry is formed exclusively between the sleeve and the housing.

11. The hydraulic steering unit according to claim 9, wherein the first commutation geometry comprises a first circumferential groove having a closed bottom, said first circumferential groove being connected to first axial grooves extending in a region of the housing in which channels open which are connected to the working chambers.

12. The hydraulic steering unit according to claim 11, wherein the second commutation geometry comprises a second circumferential groove being connected to second axial grooves extending in the region of the housing, wherein the second commutation geometry comprises openings to the spool.

* * * * *

UNITED STATES PATENT AND TRADEMARK OFFICE
CERTIFICATE OF CORRECTION

PATENT NO. : 11,623,684 B2
APPLICATION NO. : 17/191226
DATED : April 11, 2023
INVENTOR(S) : Mogens Frederiksen, Niels Arbjerg and Poul Ennemark It is certified that error appears in the above-identified patent and that said Letters Patent is hereby corrected as shown below:

On the Title Page

Under ABSTRACT "12 Claims, 6 Drawing Sheets" should read --12 Claims, 5 Drawing Sheets-- as shown on the attached page.

In the Drawings

Please delete Sheet 6 of 6.

Signed and Sealed this
Thirteenth Day of February, 2024

Katherine Kelly Vidal
Director of the United States Patent and Trademark Office

(12) United States Patent
Frederiksen et al.

(10) Patent No.: US 11,623,684 B2
(45) Date of Patent: Apr. 11, 2023

(54) HYDRAULIC STEERING UNIT (71) Applicant: Danfoss Power Solutions ApS, Nordborg (DK)

(72) Inventors: Mogens Frederiksen, Sydals (DK); Niels Arbjerg, Sydals (DK); Poul Ennemark, Sonderborg (DK)

(73) Assignee: Danfoss Power Solutions ApS, Nordborg (DK)

(*) Notice: Subject to any disclaimer, the term of this patent is extended or adjusted under 35 U.S.C. 154(b) by 0 days.

(21) Appl. No.: 17/191,226

(22) Filed: Mar. 3, 2021

(65) Prior Publication Data
US 2021/0284229 A1 Sep. 16, 2021

(30) Foreign Application Priority Data
Mar. 10, 2020 (DE) .................. 102020106440.3

(51) Int. Cl.
*B62D 5/087* (2006.01)
*B62D 5/09* (2006.01)

(52) U.S. Cl.
CPC .............. *B62D 5/087* (2013.01); *B62D 5/09* (2013.01)

(58) Field of Classification Search
CPC ........... B62D 5/087; B62D 5/09; B62D 5/083; B62D 5/097
USPC ................................................ 180/411
See application file for complete search history.

(56) References Cited

U.S. PATENT DOCUMENTS

| | | | | |
|---|---|---|---|---|
| 2,798,461 A | * | 7/1957 | Gold | F15B 13/04 137/625.69 |
| 2,827,976 A | * | 3/1958 | Brand | B62D 5/087 91/382 |
| 2,984,215 A | * | 5/1961 | Charlson | B62D 5/097 418/61.3 |
| 3,528,521 A | | 9/1970 | Ellis | |

(Continued)

FOREIGN PATENT DOCUMENTS

| | | |
|---|---|---|
| CN | 1189134 A | 7/1998 |
| CN | 101970277 A | 2/2011 |

(Continued)

OTHER PUBLICATIONS

First Examination Report for Indian Serial No. 202114001805 dated Feb. 10, 2022.

(Continued)

*Primary Examiner* — Jacob B Meyer
*Assistant Examiner* — Myles A Harris
(74) *Attorney, Agent, or Firm* — McCormick, Paulding & Huber PLLC (57) ABSTRACT

The invention relates to a hydraulic steering unit (1) including a housing (3), a spool, a sleeve (12) arranged between spool and housing (3), and a measuring motor (14) having a number of working chambers (15), wherein a first commutation geometry (18) and a second commutation geometry (19) are arranged between the sleeve (12) and the housing (3), wherein the commutation geometries (18, 19) are connected to the working chambers (15) of the measuring motor (14) and the housing includes a first direction port (4), a second direction port (5), a pressure port (6), and a return port (7). The object is to have a good steering behavior. To this end one of the commutation geometries (18) is directly connected to the first direction port (4).

12 Claims, 5 Drawings Sheets